(12) United States Patent
Lupke et al.

(10) Patent No.: US 6,644,951 B2
(45) Date of Patent: Nov. 11, 2003

(54) MOLDING APPARATUS WITH MOLD BLOCK SECTION TRANSFER SYSTEM

(76) Inventors: Manfred A. A. Lupke, 92 Elgin Street, Thornhill, Ontario (CA), L3T 1W6; Stefan A. Lupke, 32 Vintage Lane, Thornhill, Ontario (CA), L3T 1X6

( * ) Notice: Subject to any disclaimer, the term of this patent is extended or adjusted under 35 U.S.C. 154(b) by 0 days.

(21) Appl. No.: 09/984,046

(22) Filed: Oct. 26, 2001

(65) Prior Publication Data

US 2002/0025355 A1 Feb. 28, 2002

(51) Int. Cl.[7] .............................................. B29C 47/90
(52) U.S. Cl. .................. 425/183; 425/185; 425/195; 425/233; 425/326.1; 425/336; 425/369; 425/392; 425/396
(58) Field of Search .................................. 425/183, 193, 425/195, 233, 325, 326.1, 336, 369, 370, 392, 396, 385

(56) References Cited

U.S. PATENT DOCUMENTS

| | | | | |
|---|---|---|---|---|
| 3,430,292 A | * | 3/1969 | Bauman et al. ............. | 425/396 |
| 4,325,685 A | * | 4/1982 | Lupke et al. ................ | 425/183 |
| 4,504,206 A | * | 3/1985 | Lupke et al. ............. | 425/326.1 |
| 5,560,941 A | * | 10/1996 | Hegler et al. ................ | 425/336 |
| 5,693,347 A | * | 12/1997 | Hegler ........................ | 425/233 |
| 6,485,286 B1 | * | 11/2002 | Hoffmann et al. ........... | 425/195 |

* cited by examiner

Primary Examiner—James P. Mackey
Assistant Examiner—Joseph Leyson

(57) ABSTRACT

A molding apparatus which is used in a continuous molding operation includes an endless looped track, track carriers which are moved around the track to and from a product shaping mold region and a transfer system for replacement of mold block members used in the apparatus. The transfer system, which operates without interrupting the molding operation includes transfer carriers controlled to move synchronized with the track carriers at a transfer location remote from the mold region and actuators which slide the mold block members between the track carriers and the transfer carriers at the transfer location when the transfer carriers are synchronized with the track carriers.

8 Claims, 5 Drawing Sheets

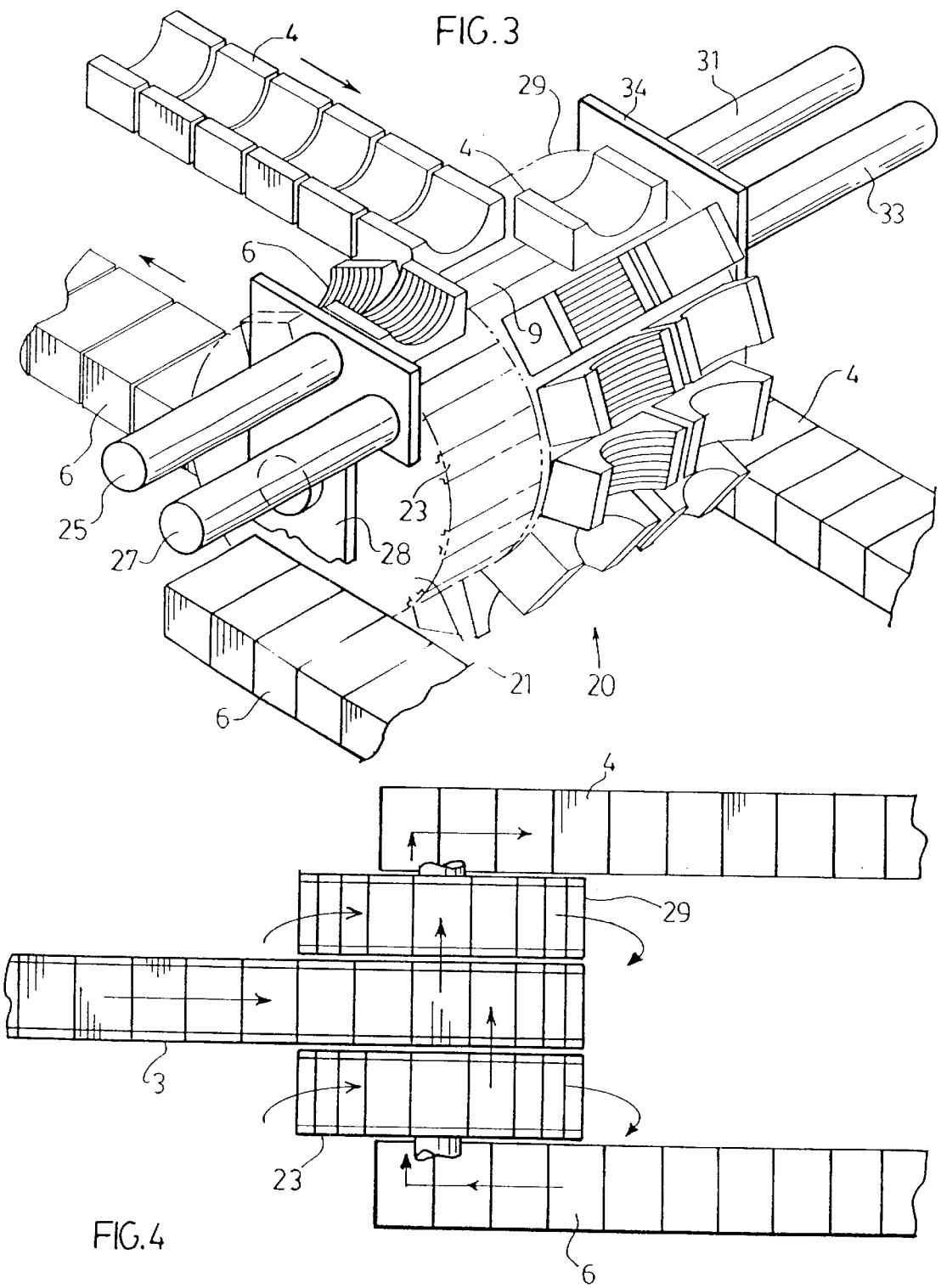

MOLDING APPARATUS WITH MOLD BLOCK SECTION TRANSFER SYSTEM

FIELD OF THE INVENTION

The present invention relates to a system for replacing mold blocks in a moving mold tunnel molding apparatus. According to the present invention, the mold blocks are replaced without interrupting operation of the molding apparatus.

BACKGROUND OF THE INVENTION

Molding apparatus, such as pipe molds, have mold blocks which continuously move around an endless track. On one side of the track the mold blocks are in a closed condition to form a moving mold tunnel where product is shaped within the molding apparatus. The mold blocks open at the downstream end of the tunnel to release the product and are then recirculated back to the upstream end of the mold tunnel.

There are currently two different styles of molding apparatus having moving mold tunnels. According to one of these styles which is known as a clam shell type molder, a pair of mold block sections are mounted on a common carrier which circulates around a single looped track. The mold block sections hinge to open and close relative to one another on opposite sides of the track.

The other style of moving mold tunnel apparatus is formed by a pair of endless tracks and the mold blocks are formed by mold block sections mounted on carriers of the two tracks. The two tracks have track portions which extend side by side parallel with one another where the mold block sections from the two tracks meet to form the moving mold tunnel.

In the past, it has been necessary for mold block replacement to stop movement of the mold blocks in a moving mold tunnel type apparatus. According to prior art replacement methods the mold blocks must be stationary in order to release them from the track and replace them with new mold blocks.

This known method of mold block replacement results in a number of drawbacks. Firstly, it is time inefficient in that the molding operation must be shut down during the replacement. Secondly, it can result in hazardous conditions as a result of the shut down. Specifically, when the shut down occurs, there is a possibility of dangerous plastic build up in the extrusion equipment which must be cleared before the extrusion equipment can be started up again.

SUMMARY OF THE PRESENT INVENTION

The present invention provides molding apparatus having a moving mold region in which mold block replacement is carried out without having to interrupt operation of the molding apparatus.

In particular, the molding apparatus of the present invention, which is used in a continuous molding operation, comprises looped endless track means, track carriers which are moved around said track means to and from a product shaping mold region, and a transfer system for replacement of mold block members used in the apparatus without interrupting the molding operation. The transfer system comprises transfer carriers controlled to move synchronized with the track carriers at a transfer location remote from the mold region and means to slide the mold block members between the track carriers and the transfer carriers at the transfer location.

BRIEF DESCRIPTION OF THE DRAWINGS

The above as well as other advantages and features of the present invention will be described in greater detail according to the preferred embodiments of the present invention in which;

FIG. 3 is a perspective view of the mold block transfer system operating at the lower track at the downstream end of the mold apparatus of FIG. 1;

FIG. 4 is a plan view of the lower track and mold block replacement system of FIG. 3;

DETAILED DESCRIPTION ACCORDING TO THE PREFERRED EMBODIMENTS OF THE PRESENT INVENTION IN WHICH

Figure 1:
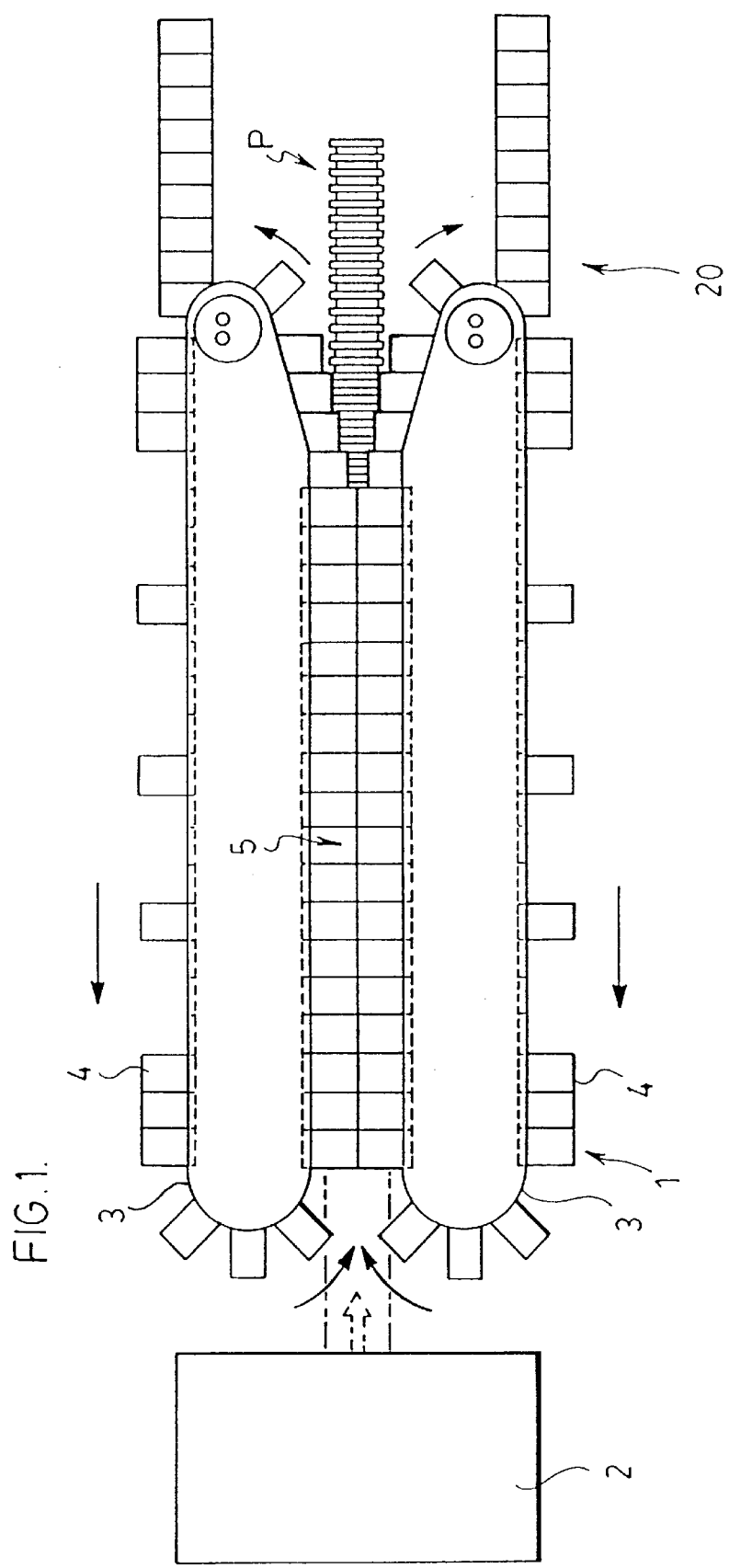
FIG. 1 is a side view of a molding apparatus according to a preferred embodiment of the present invention.

FIG. 1 shows a molding apparatus generally indicated at 1. This molding apparatus comprises a pair of endless tracks 3 with a plurality of mold block sections 4 being carried around each of the tracks. The two tracks have track regions adjacent and parallel one another where the mold block sections from the upper track meet with the mold block sections of the lower track to form a moving mold tunnel 5. An extruder 2 feeds molten plastic into the upstream end of the mold tunnel where a pipe P is formed emerging from the downstream end of the mold tunnel.

As indicated by the arrows in FIG. 1, mold block sections 3 continuously circulate around the two tracks. Each of the tracks include a quick return on the track regions away from the mold tunnel where the mold block sections are separated from one another. This quick return does not form part of the present invention.

A mold block replacement or transfer system generally indicated at 20 is provided at the downstream end of the molding apparatus. This mold block transfer system allows replacement of the mold block sections 4 with other mold block sections as to be described later in detail without interrupting the molding operation performed by the apparatus.

Figure 2:
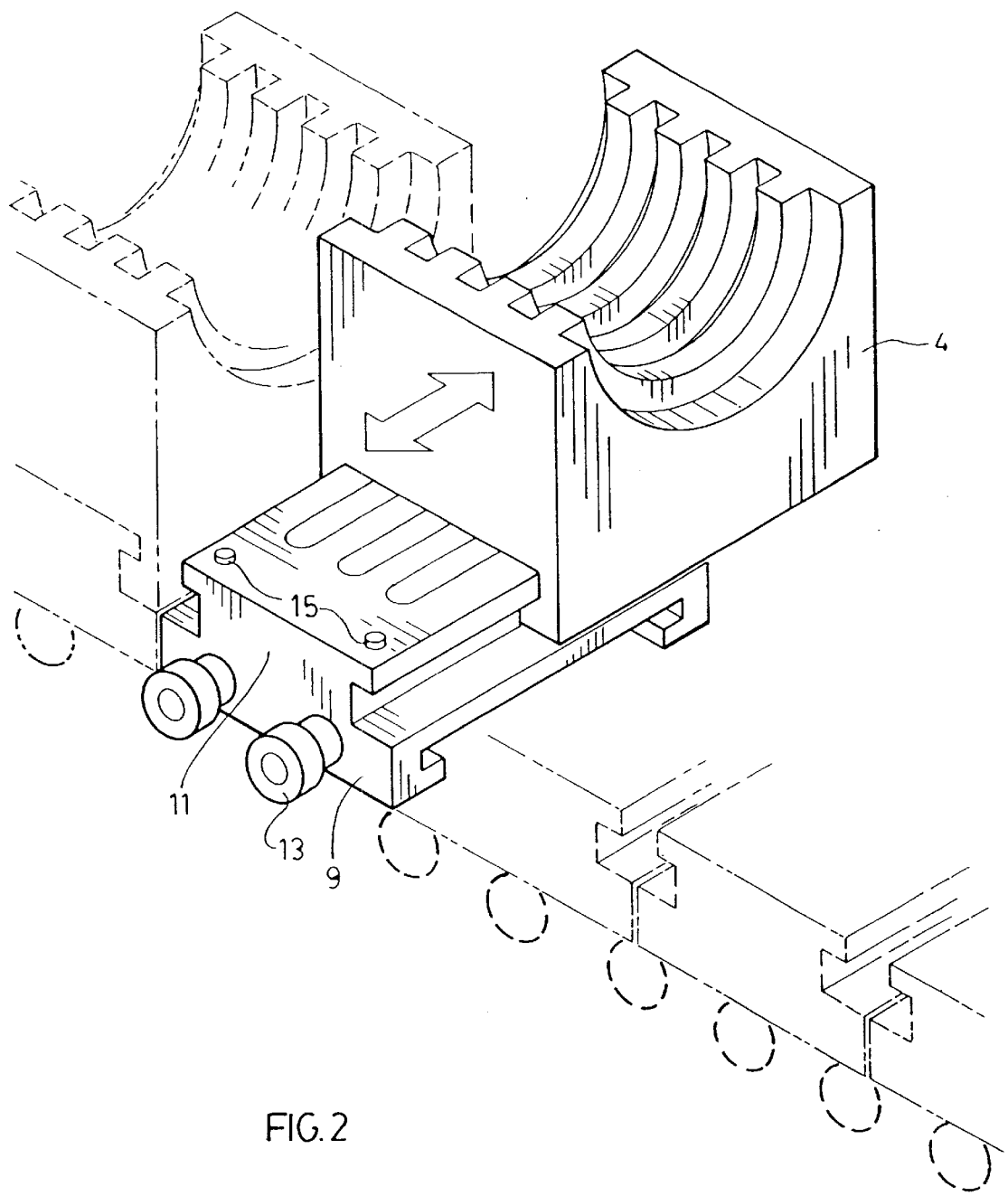
FIG. 2 is a perspective view showing a mold block carrier and a mold block section as mounted to the carrier from the molding apparatus of FIG. 1.

Before going into detail with respect to the mold transfer system reference is made to FIG. 2 of the drawings which shows specific details with respect to the mold block sections 4 and carriers 9 on which the mold block sections are slideably mounted. These carriers include a T-shaped portion 11 which fits into a correspondingly shaped opening in the base of the mold block sections. As shown in FIG. 2, this enables the mold block sections to be slid on and off of their carriers in a sideways direction but prevents the mold block sections from lifting upwardly off of the carriers. Spring detentes 15 are provided in the mold block carriers and these spring detentes engage with the mold block sections to prevent them from inadvertently shifting while they move around the track. However, the spring pressure applied by the detentes can be easily overcome by pusher and puller members as again to be described later in detail used at the mold transfer system.

Each of the carriers 9 further includes rollers 13 which fit within each of the guide tracks 3 as the carriers move around the guide tracks.

Mold transfer system 20 is well shown in FIG. 3 of the drawings. Here it will be seen that a pair of rotatable housings 21 and 29 are provided to each side of track 3 at its rounded downstream end region where the track guides the mold block sections away from the mold tunnel and towards the return side of the track.

Housing 21 is provided with a plurality of mold block carriers 23 on its outside surface. Corresponding mold block carriers are provided on housing 29. These transfer carriers have the same T-shaping as found in the track carriers 9.

Mold block transfer actuators 25 and 27 are supported by frame member 28 adjacent housing 23. Similar actuators 31 and 33 are supported by frame member 34 at housing 29.

Transfer system 20 is specifically designed to work with a molding apparatus having large mold block sections moved at a relatively slow pace. In this type of arrangement, the actuators may be fixed in position as shown in FIG. 3.

In the operation of system 20, the mold block sections 4 are moved to the rounded downstream end of the track. As they start to pass around the end of the track, housing 29 is rotated such that an empty carrier on housing 29 aligns side by side with the carrier on which the mold block section on the track is mounted. From here, housing 29 is rotated at a speed consistent with that of the track so that as each empty transfer carrier arrives to the transfer location, i.e. the location at which it will receive one of the mold block sections 4 it aligns with the next track carrier.

When the empty transfer carrier aligns with the track carrier on which the mold block section is mounted, actuator 31, which is a pulling piston, reaches across housing 29 and quickly pulls the slow moving mold block section 4 off of its track carrier onto the aligned transfer carrier. This then completes the pulling of the mold block section 4 off of the track onto housing 29.

The removal of mold block section 4 as described above exposes the track carrier 9. The track continues to move the exposed carrier 9 around the end region of the track. At the same time, housing 21 is being rotated such that one of the carriers 23 having a replacement mold block 6 slideably mounted on that transfer carrier aligns with the empty track carrier 9. Actuator 27, which is a piston-like plunger, then pushes the replacement mold block section 6 from the transfer carrier onto the track carrier.

The above operation of removal of mold block sections 4 onto housing 29 and the replacement with the new mold block sections 6 occurs as each successive track mounted mold block section reaches the transfer system.

FIG. 4 shows that housing 21 is fed from a train of mold block sections 6 while the mold block sections 4 are taken off of housing 29 along a removal train for the replaced mold block sections. This allows for a replacement of all of the mold block sections on the track through the feed and take away trains using only the rotatable housings 23 and 29. Each of the feed and removal trains is indexed to move in synchronism with the two housings 21 and 29 in the same manner as that found with the synchronized movement between the track and the housings as earlier described. This allows the mold block sections, which are mounted on slide fit carriers, to be pushed onto the empty track carriers 23 of housing 21 at the one side of the system and at the other side of the system allows the replaced mold block sections 4 to be removed from housing 29.

Although the drawings show only to the lower mold block section track, the same thing is simultaneously occurring at the upper mold block section track.

The description above refers to the replacement of all of the mold block sections around the track. This would occur when a completely new profile is to be formed at the moving mold tunnel, e.g. when changing from a smooth walled to a ribbed pipe. In some instances however it may only be desirable to change the profile of the pipe at a specific location which would not necessitate changing all of the mold block sections. In this type of a situation, the mold block sections taken off of the track would only be temporarily stored at housing 29 to be replaced by mold block sections 6. Once the mold block sections 6 have served their purpose, they would then be moved back onto housing 21 and the mold block sections 4 on housing 29 would be moved back onto the track. This is done by reversing the transfer operation earlier described. For this purpose, actuator 25 acts as a puller to pull the mold block sections 6 onto empty carriers of housing 21 to once again expose carrier 9 and actuator 33, which in this case, acts as a plunger pushes the original block section 4 back onto the exposed carrier 9.

Figure 5:
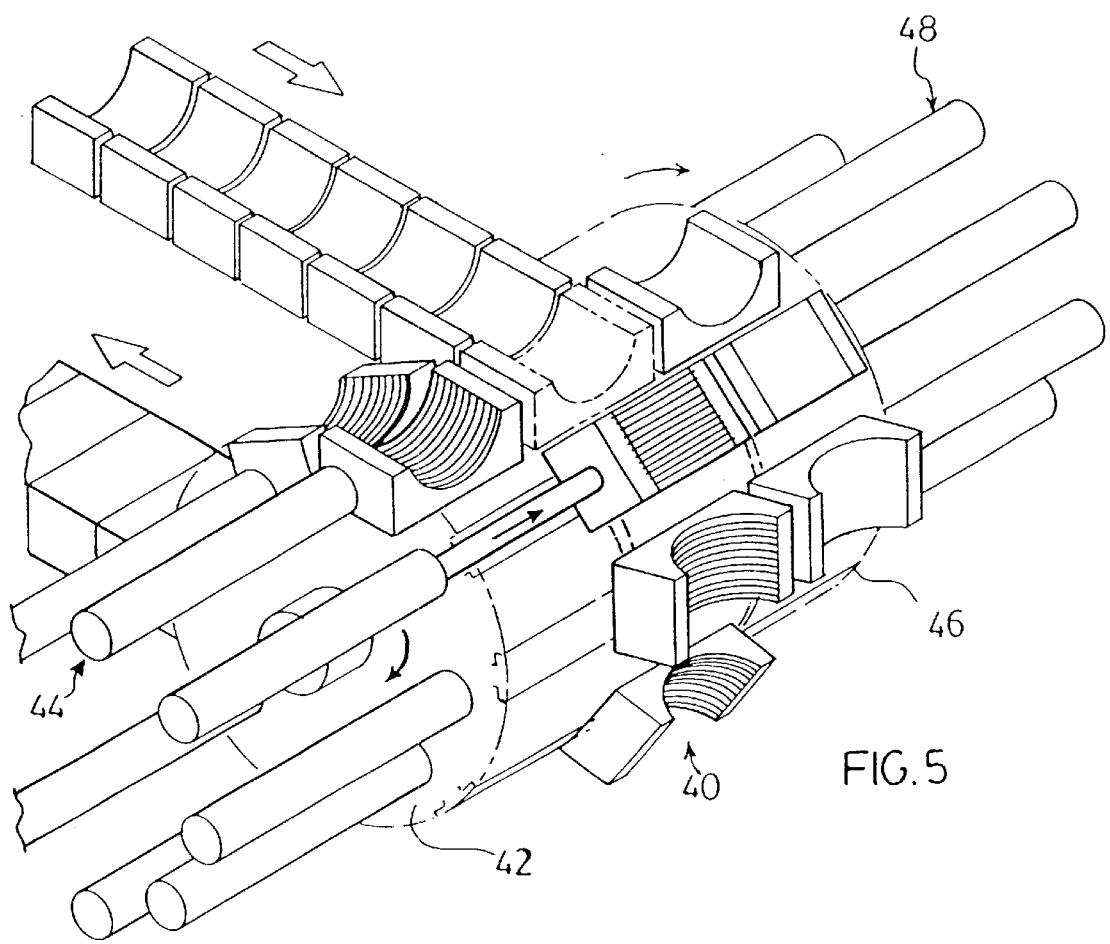
FIG. 5 is a perspective view of a mold block replacement system according to a further preferred embodiment of the present invention.

FIG. 5 shows a slightly different transfer system generally indicated at 40. This system, like the earlier described system, includes rotatable housings 42 and 46 to either side of the downstream end of either of the upper and lower tracks. Housings 42 and 46 are again provided with slide fit transfer carriers.

The prime difference between system 40 and system 20 is that unlike system 20, which as noted above is used for a heavier slow moving apparatus, system 40 is more designed for a higher speed smaller mold block section apparatus.

In system 20, the actuators are not required to move because they can perform their pushing and pulling functions at a single location because of the slow moving speeds of the mold block sections. However, in FIG. 5, system 40 includes a plurality of mold block movers 44 which move around with housing 42 and a plurality of mold block movers 48 which move around with housing 46. Accordingly, the plungers, like the transfer carriers, maintain constant synchronized alignment with the track carriers. This enables them to push or pull the mold blocks to and from the track onto either of the two housings while everything is moving at a relatively high speed.

Figure 6:
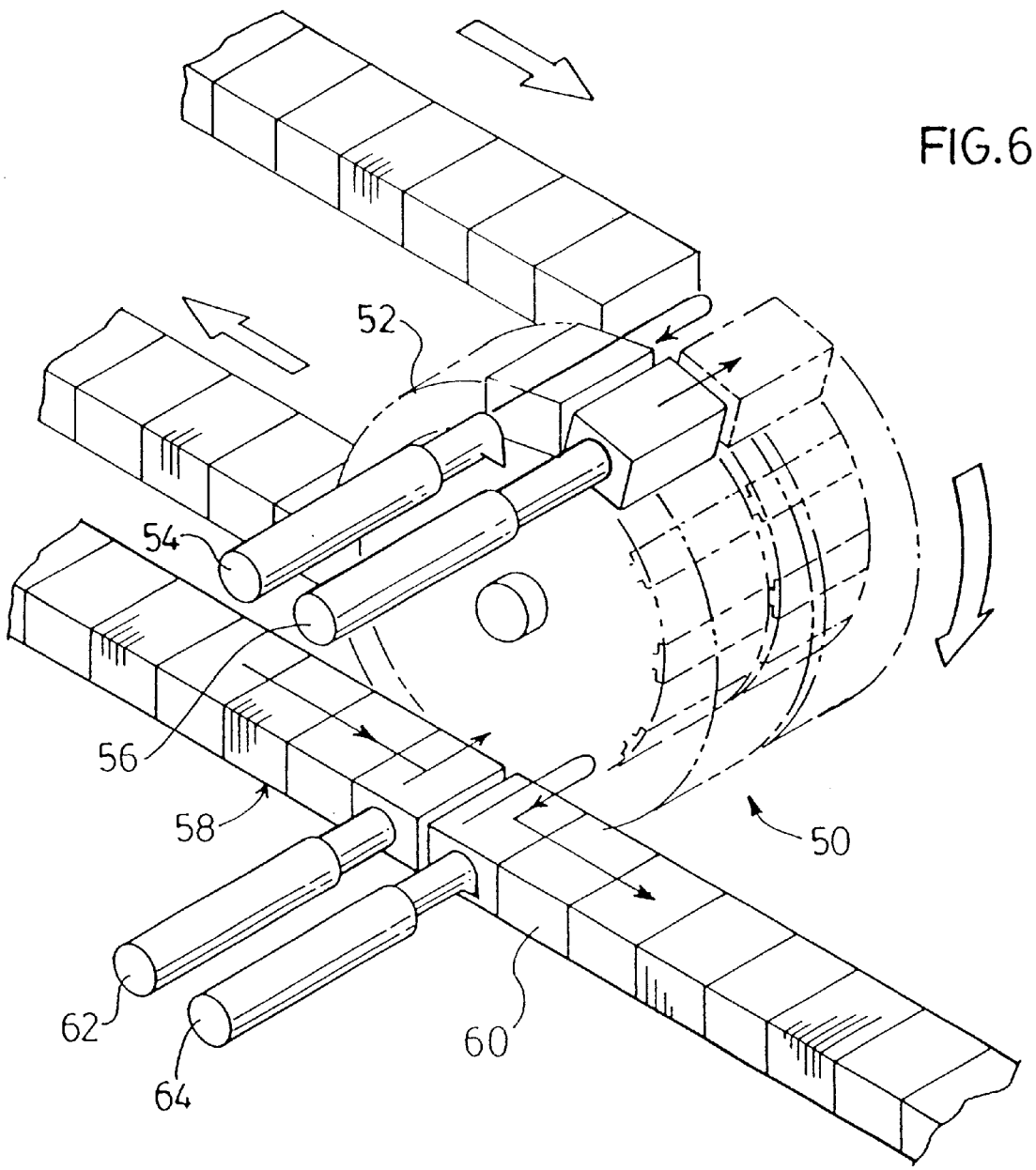
FIG. 6 is a perspective view of another mold block transfer system according to still a further preferred embodiment of the present invention.

FIG. 6 shows a mold block transfer system 50 which is different from systems 40 and 20 in that unlike the earlier described systems, system 50 both removes and replaces the track mold blocks from one side only of the track. This system uses a rotating housing 52 having slide fit carriers which are fed with replacement mold block sections from a feed train 58. The replacement mold block sections are pushed onto the carriers on housing 52 when empty by means of a plunger 62.

The mold block sections which come off of the track onto the housing 52 are then taken off of the housing by means of a puller 64 which draws the replaced mold block sections onto a take away train 60.

In order to carry out the transfer of mold block sections from the track onto housing 52, the system includes a mold block section puller 54 and a mold block section pusher 56. The puller and the pusher, unlike all of the above pusher and pullers, are not in dedicated positions but rather can be moved to different positions. They can also be controlled to move in synchronism with the housing 52. The housing 52 is operated such that an empty carrier on the housing aligns and moves at a corresponding speed with a block mounted carrier of the track. Puller 54 is then operated to slide the block off of the track onto the housing. Housing 54 must then be indexed so as to position a replacement block thereon with the now empty space on the track. This indexing can be achieved in a number of manners such as stopping, reversing or accelerating the rotation of housing 52 to the extent that the replacement block aligns with the empty track carrier. Once this alignment is achieved, then the rotatable housing is once again moved in sync with the track. At this point, pusher 56 operates to push the replacement block onto the track.

Although all of the description above relates to the two track pipe molding apparatus shown in the drawings the transfer system is equally usable with a single track system using clam shell type mold blocks.

It will be apparent from the description above that the replacement of the mold block sections whether this be done on a double or a single track apparatus, is achieved away from the mold tunnel while the apparatus continues to function thereby allowing continued molding in the tunnel. In the preferred embodiment, the transfer is, as described, performed at the downstream end of the mold tunnel, however it could equally as well be performed at any other location along the track travel remotely of the mold tunnel.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. Molding apparatus for use in a continuous molding operation, said molding apparatus having looped endless track means, said track means being fitted with track carriers which are moved around said track means to and from a product shaping mold region, and a transfer system for replacement of first block members initially set up on said track means with replacement mold block members used in said apparatus, the replacement being made without interrupting the molding operation, said transfer system including transfer carriers controlled to move in synchronization with the track carriers at a transfer location remote from said mold region, the transfer carriers providing mounting locations for the first mold block members as they are moved off of the track carriers onto the transfer carriers, the track carriers then providing mounting locations for the replacement mold block members as they are moved from the transfer carriers onto the track carriers.

2. Molding apparatus as claimed in claim 1 wherein both said first mold block members and said replacement mold block members have corresponding track carrier and transfer carrier mounting bases which provide for an interlocking slide mounting of the first mold block members and the replacement mold block members on both the track carriers and the transfer carriers, and wherein both the track carriers and the transfer carriers have corresponding mounting seats to slideably receive the mounting bases of both the first mold block members and the replacement mold block members.

3. Molding apparatus as claimed in claim 2 wherein each of the mounting bases of both the first mold block members and the replacement mold block members comprises a T shaped slot and wherein each of the mounting seats of both the track carrier and the transfer carrier comprises a T shaped member for slideably interlocking with each T shaped slot.

4. Molding apparatus as claimed in claim 2 including a spring detente on each mounting seat of each track carrier, said spring detente providing a tight fit between the mounting seat of the track carrier and any one of the mounting bases of the first mold block members and the replacement mold block members.

5. Molding apparatus as claimed in claim 1 wherein said transfer system comprises a rotating housing provided with said transfer carriers, said housing being controlled to stop, reverse and accelerate relative to said track carriers to provide the synchronization of the transfer carriers with the track carriers.

6. Molding apparatus as claimed in claim 5 wherein said rotating housing receives the replacement mold block members from a supply line and wherein the rotating housing deposits the first mold block members onto a take away line for replacing all of said first mold block members with said replacement mold block members.

7. Molding apparatus as claimed in claim 6 including actuators for said first mold block members and said replacement mold block members, said actuators acting as both pushers and pullers to move the first mold block members and the replacement mold block members between the track carriers and the transfer carriers.

8. Molding apparatus as claimed in claim 1 wherein said transfer system includes first and second rotating housings provided with said transfer carriers to opposite sides of said track means, said first housing being fed from a supply of said replacement mold block members and said second housing feeding to take away of said first mold block members for replacing all of said first mold block members with said replacement mold block members.

* * * * *